United States Patent [19]

Choi

[11] Patent Number: 4,544,849
[45] Date of Patent: Oct. 1, 1985

[54] METHOD AND APPARATUS FOR TIDAL ELECTRIC POWER GENERATION USING THE BUOYANCY ENERGY OF THE TIDE

[76] Inventor: In K. Choi, 596-13 Dae Hung Dong, Po Hang City, Keong Sang Buk Do, D.P.R. of Korea

[21] Appl. No.: 524,329

[22] Filed: Aug. 18, 1983

[30] Foreign Application Priority Data

Mar. 26, 1980 [KP] D.P.R. of Korea .................. 80-1238

[51] Int. Cl.$^4$ .............................................. F03B 13/12
[52] U.S. Cl. ........................................ 290/53; 290/42; 60/496
[58] Field of Search ...................... 60/496; 290/42, 53; 417/100, 330, 331, 333

[56] References Cited

U.S. PATENT DOCUMENTS

| | | | |
|---|---|---|---|
| 45,867 | 1/1865 | Scharit | 60/496 |
| 925,581 | 6/1909 | Kendall | 60/496 |
| 975,157 | 11/1910 | Quedens | 60/496 |
| 1,555,487 | 9/1925 | Sauer et al. | 417/331 |
| 4,185,464 | 1/1980 | Rainey | 60/496 |
| 4,208,878 | 6/1980 | Rainey | 60/496 |
| 4,249,085 | 2/1981 | Kertzman | 290/53 |

Primary Examiner—William M. Shoop, Jr.
Assistant Examiner—W. E. Duncanson, Jr.
Attorney, Agent, or Firm—Oblon, Fisher, Spivak, McClelland & Maier

[57] ABSTRACT

The present invention relates to a method and apparatus for tidal electric power generation using the buoyancy energy of the tide. The present invention includes a buoyant container having a balancing buoyant room and a flood gate, a power transmission apparatus having a converting apparatus, and a four-way valve. The buoyancy force of the buoyant container is decreased during the upward movement of the container while the kinetic energy decreases during the downward movement of said container. With control of the four-way valve, the decreasing buoyancy force is partially compensated for by the pumping of water from the buoyant container and the kinetic energy is reinforced by filling the buoyant container with water. The converting apparatus comprises two conic helical gears. By using the conic helical gear, the buoyancy force and the kinetic energy are constantly transmitted into the pump. Particularly, this invention contains a brake which holds the buoyant container at a height where the weight of the buoyant container balances with the buoyancy force. At the ebb and flow of the tide, the brake is released and instantaneous force is produced. By virtue of the present invention, the greater energy can be obtained with little energy loss compared with the conventional manner.

9 Claims, 14 Drawing Figures

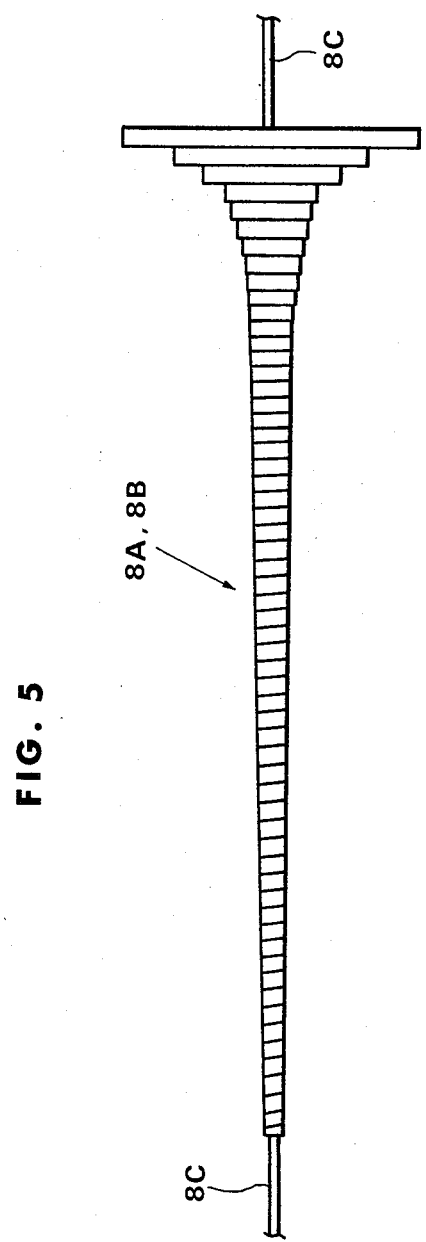

FIG. 8A  FIG. 8B  FIG. 8C
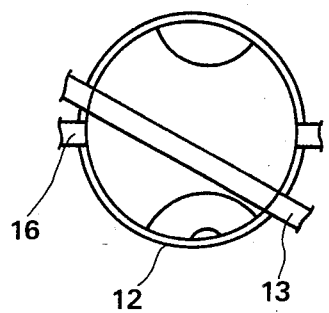
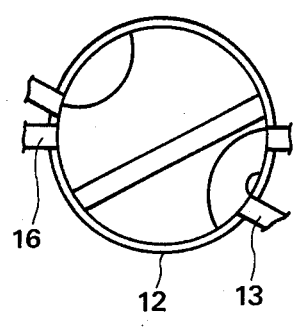
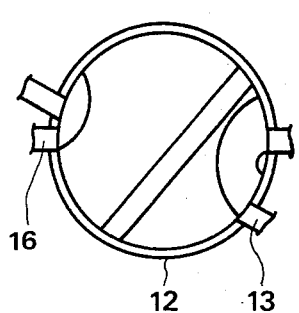
FIG. 8D  FIG. 8E
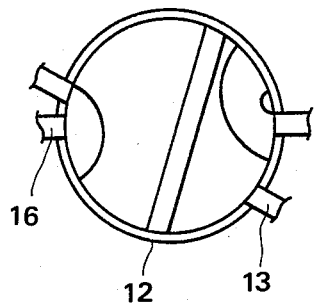
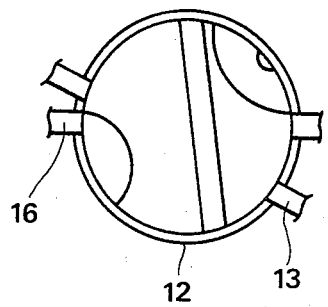
FIG. 9
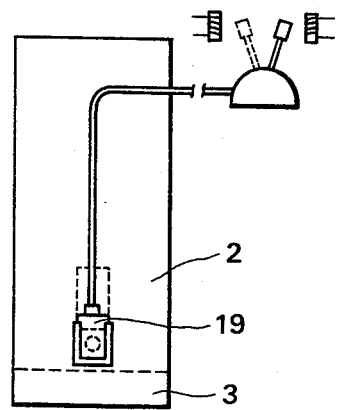

METHOD AND APPARATUS FOR TIDAL ELECTRIC POWER GENERATION USING THE BUOYANCY ENERGY OF THE TIDE

BACKGROUND OF THE INVENTION

1. Field of the Invention

The present invention relates to a method and apparatus for tidal electric power generation using the buoyancy energy of the tide. The invention relates particularly to the power transmission apparatus used to compensate for the change of buoyancy during the repetitive upward and downward motion of the buoyant container in accordance with the ebb and flow of the tide.

2. Description of the Prior Art

In the prior art, tidal electric power was generated through the use of a dam beneath which a turbine was installed A turbine rotated according to the ebb and flow of the tide and the mechanical energy of this rotation was used to generate electricity. However, the actual implementation of the said method was much too difficult and expensive. There was also a defect present ie., the enormous loss of energy during the process of transforming tidal energy to electric power.

A SUMMARY OF THE INVENTION

An objective of the present invention is to overcome the above mentioned defects and to provide a method and apparatus for tidal electric power generation utilizing the buoyancy energy of the tide from which the greater energy can be obtained by controlling the weight of the buoyant container compared with the conventional manner.

A second objective of the invention is to provide a method and apparatus for instantaneous generation of electrical power using the buoyancy energy of the tide and the kinetic energy produced by the regulation of the weight of the buoyant container.

A third objective of this invention is to utilize a conic helical gear to uniformly maintain the driving force of the pump.

The said objectives and others will be achieved through use of conic helical gear and the brake and through control of the water level within the buoyant container. The said conic helical gear will control the driving force of the pump so that the driving force of the said pump remains constant despite the constant vertical movement of the buoyant container.

BRIEF DESCRIPTION OF THE DRAWINGS

FIG. 5 is a schematic enlarged view of the conic helical gear.

FIG. 8A to FIG. 8E are schematic views of the valve of the water pump, and demonstrate the respective valve positions changed in accordance with the operating procedures.

FIG. 9 is a schematic view of the locking device, demonstrating the operation of the locking device and its control of the internal water level of the buoyant container.

DESCRIPTION OF THE PREFERRED EMBODIMENTS

Figure 1:
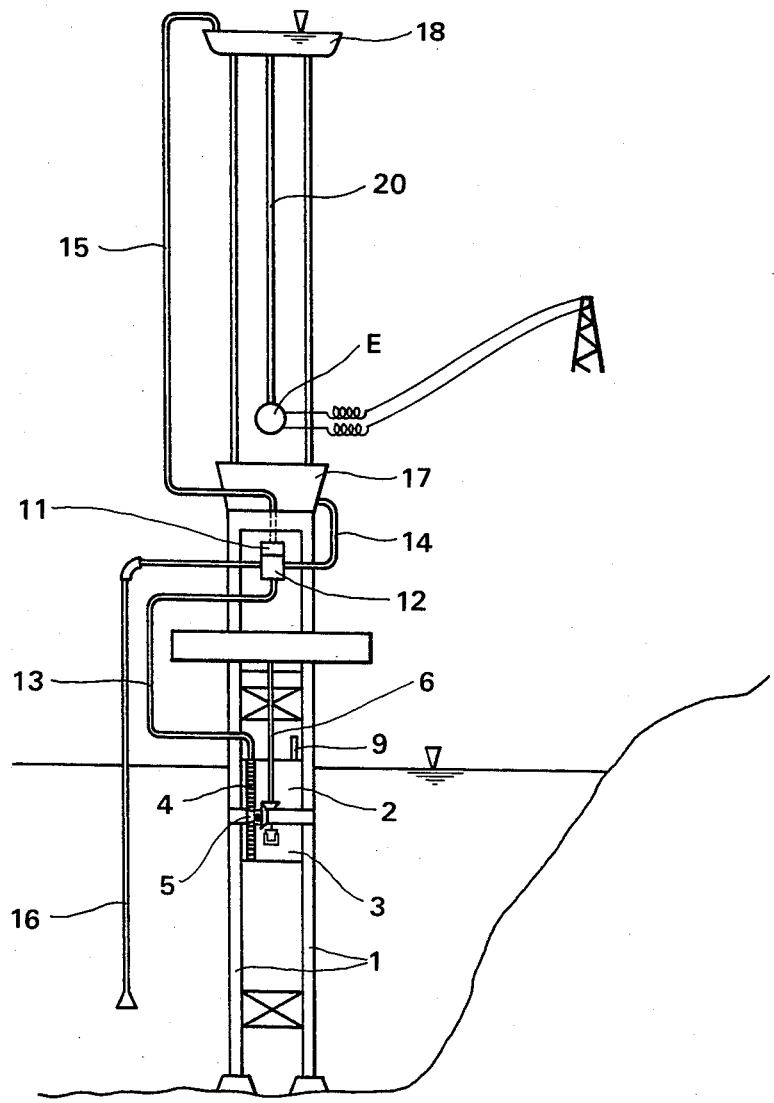
FIG. 1 is a schematic view of the tidal electric power generation plant including the buoyant apparatus and the power transmission apparatus.

FIG. 1, the electric power generation plant is installed above the piles (1) which are built on the sea floor. The buoyant container (2) slides vertically between the piles. The balancing buoyant room (3) is situated beneath the buoyant container (2) and the room is filled with air for the purpose of maintaining a constant buoyant force of the buoyancy container (2). The height of the buoyant container is twice the difference between the highest level and the lowest level of the tide. Also, the size of the buoyant container is decided so as to balance the weight of the buoyant container and the water therein with the buoyant force of the buoyant room (3) when the buoyant container is positioned at its highest level or lowest level. The rack (4) and the flood gate (19) are installed on the side wall of the buoyant container (2). The airlet (9) is located on the top of the buoyant container (2). The pinion (5) of the power transmission apparatus (22) is installed at the cross member attached to the piles (1). The pinion (5) of the power transmission apparatus will be driven by the rack (4). The power transmission apparatus (22) is located above the buoyant container (2). The pump (11) and the four-way valve (12) are located above the transmission apparatus (22). The pump (11) is driven by the transmission apparatus (22) for the purpose of pumping sea water or the water from the buoyant container (2) into the upper reservoir (18). Also, the four-way valve (12) is controlled by a suitable means, i.e., an electrical control means so that the water passageways may be controlled. (See FIG. 8A to FIG. 8E). The four conduits (13,14, 15,16) are respectively connected to the four-way valve (12). Conduit (13) is connected to the buoyant container (2) and conduit (16) is immersed in the sea. Conduit (14) is connected to the lower reservoir (17). Conduit (15) is connected through the pump (11) to the upper reservoir (18). The upper reservoir (18) is mounted above the lower reservoir (17). The water pumped into the upper reservoir (18) is discharged through the duct (20) into the generator (E) which, in turn, produces electric power. The water passing through the generator (E) is collected in the lower reservoir (17).

FIGS. 2 through 5 describe the operation and construction of the buoyant apparatus, power transmission apparatus and the conic helical gear.

As the buoyant container (2) moves upward, an additional buoyancy force is added to the pre-existing buoyancy force by reducing the water level within the buoyant container, thereby, reducing the weight of the said container. As the buoyant container moves downward, its kinetic energy increases in accordance with the increment of the water level within the buoyant container, i.e., the increment of the weight of the said container. The rack (4) drives the pinion (5) causing the following continuous reaction:

(a) rotation of the pinion (5), (b) rotation of the bevel gears (29A, 29B),
(c) rotation of the vertical shaft (6),
(d) rotation of the helical or bevel gears,
(e) rotation of the conic helical gear (8A, 8B) of the power transmission apparatus (22).

The operation and control of the above will be further described through a detailed explanation of FIGS. 8A to 8E.

Figure 7:
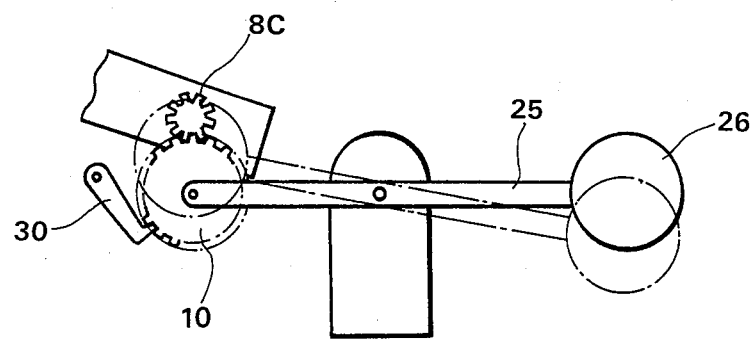
FIG. 7 is a schematic view of the equipment of the energy transmission to the water.

The lead angle of the conic helical gears (8A, 8B) increases with movement from smallest portion (ie, with a small diameter) to the largest portion (ie, with a large diameter) of the said gear whereas the pitch remains the same as shown in FIG. 5. Moreover, the teeth of the wreath shell gear are formed spirally on the surface of said gear. Therefore, when gear (7) is rotated, the conic helical gear (8A or 8B) is engaged and moves along the axis. As a result, the power converting apparatus (23) moves reciprocally along the shaft (28). The shaft (8C) of the conic helical gear (8A or 8B) is designed to fit the teeth of the gear. The teeth of the shaft (8C) engage with the gear (10) of the lever (25) which is biased upwardly by the weight (26) as shown in FIG. 7. The shaft of the gear (10) is connected to the shaft of the pump (11) by a suitable means.

Figure 6A:
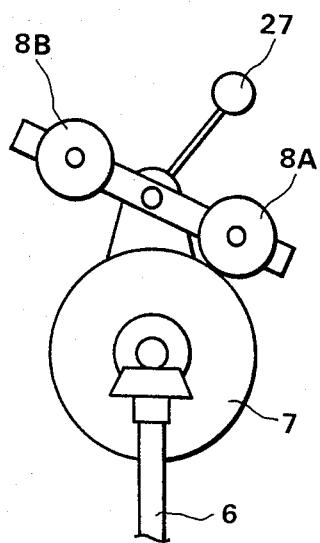
FIG. 6A and FIG. 6B are the schematic section views of the power transmission equipment, referred to in FIG. 4 and demonstrating the operation thereof.
Figure 6B:
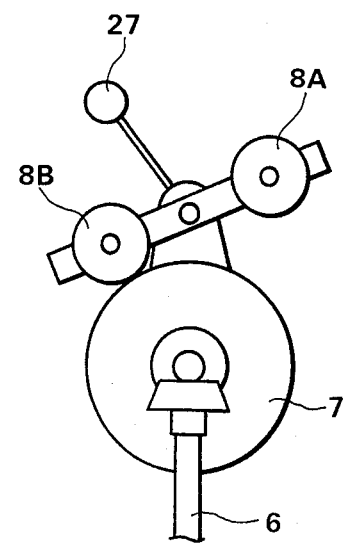

FIGS. 6A and 6B described the power converting apparatus (23). FIG. 6A illustrates the case in which the wreath shell gear (8A9 engages with gear (7) when the buoyant container (2) is moved upward by the buoyancy force. Moreover, FIG. 6B illustrates the case in which the conic helical gear (8B) engages with the gear (7) when the buoyant container (2) is pulled down by its weight, (ie, after it has been filled with water). The converting apparatus (23) is shifted in accordance with the ebb or flow of the tide through the manual operation of the handle (25) or through the use of another suitable means of electrical control.

The operation of the apparatus according to the invention will be described in detail in FIG. 8A to FIG. 8E as follows.

Figure 2:
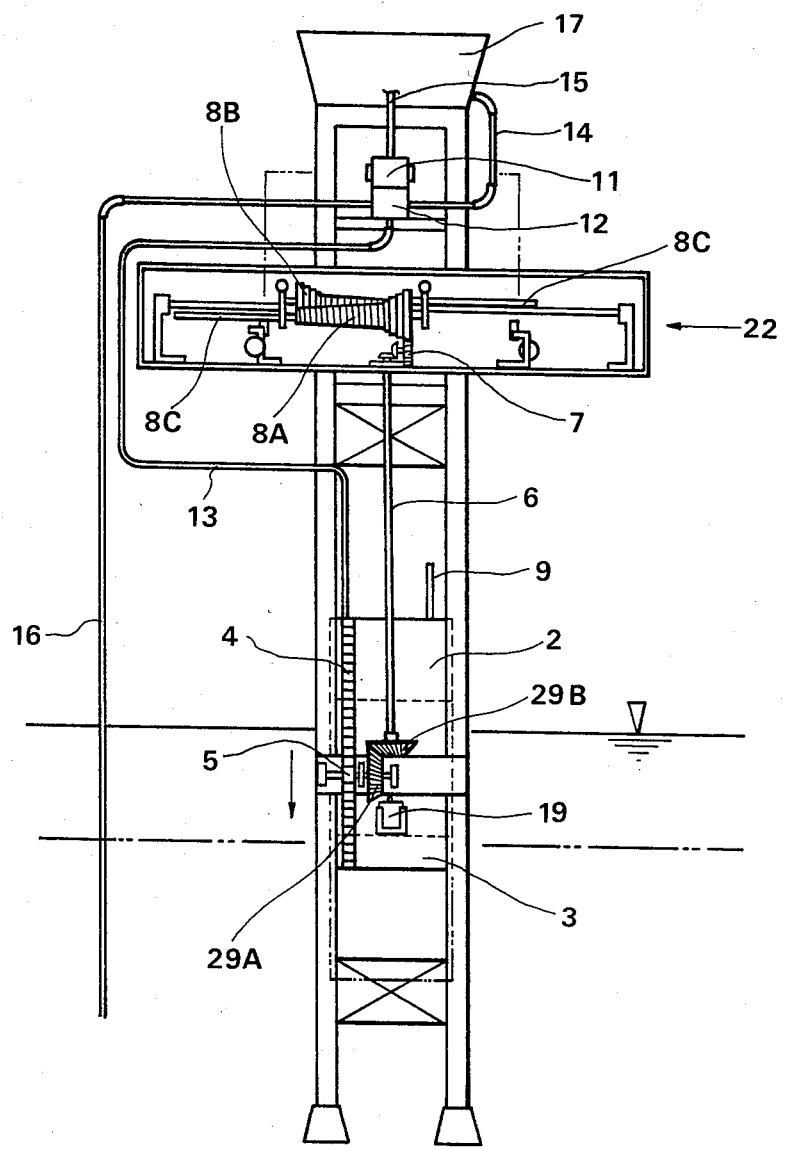
FIG. 2 is a side schematic view of the buoyant apparatus and the power transmission apparatus, demonstrating the effect of the high tide on the buoyancy apparatus.
Figure 4:
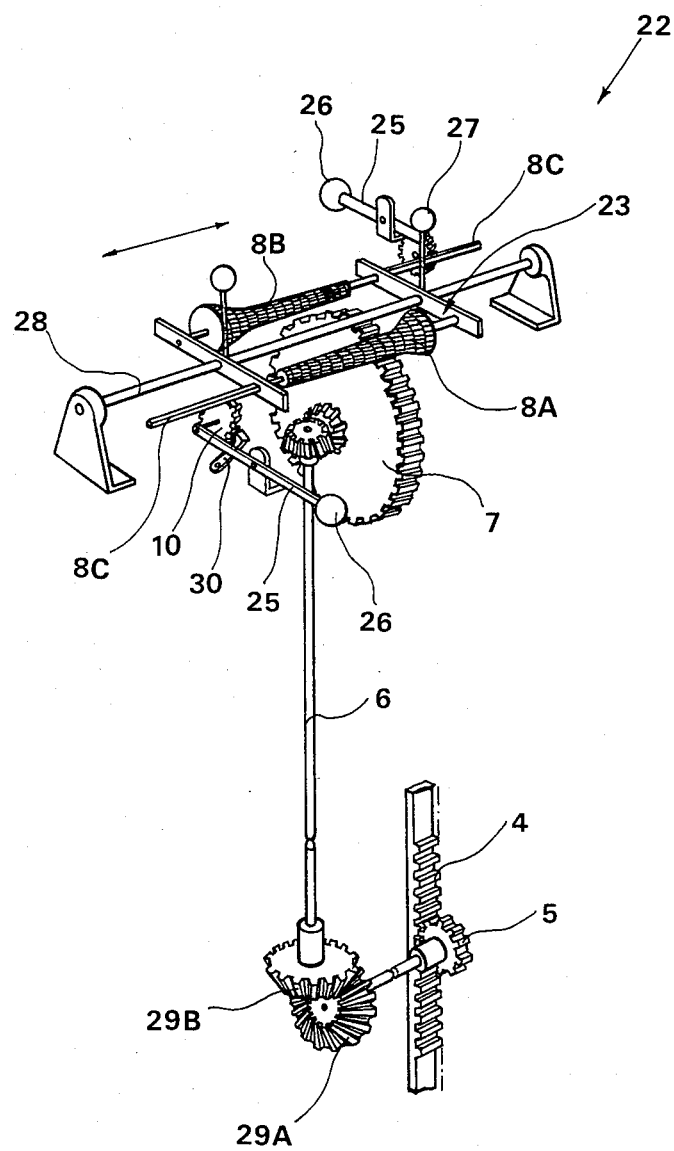
FIG. 4 is a partial view of the power transmission equipment.

FIG. 8A illustratess the position of the four-way valve (12) when the buoyant container (2) in FIG. 2 is raised during the flow tide. When the brake (30) as shown in FIG. 7 is released, the buoyant container (2) begin to rise due to the buoyant force so that the rack causes the pinion (5) to rotate, instantaneously producing the force necessary for the operation of the pump (11). At that point, the converting apparatus (23) is in the position shown in the FIG. 6A and the gear (7) engages with the conic helical gear (8A), which rotates both the shaft (8C) and the gear (10) as shown in FIG. 2 and FIG. 4. Therefore, through the operation of the pump (11), the sea water contained in the buoyant container (2) is pumped into the upper reservoir (18) through the conduits (13, 15). As a result, the water level within the buoyant container (2) is lowered, causing the buoyancy force to increase. When the buoyant container (2) reaches the highest position, it must stop. At that point, the previously pumped water drops through the duct (20) and generates electricity by means of the generator (E). In the meantime, the above mentioned water is collected in the lower reservoir (17).

Figure 3:
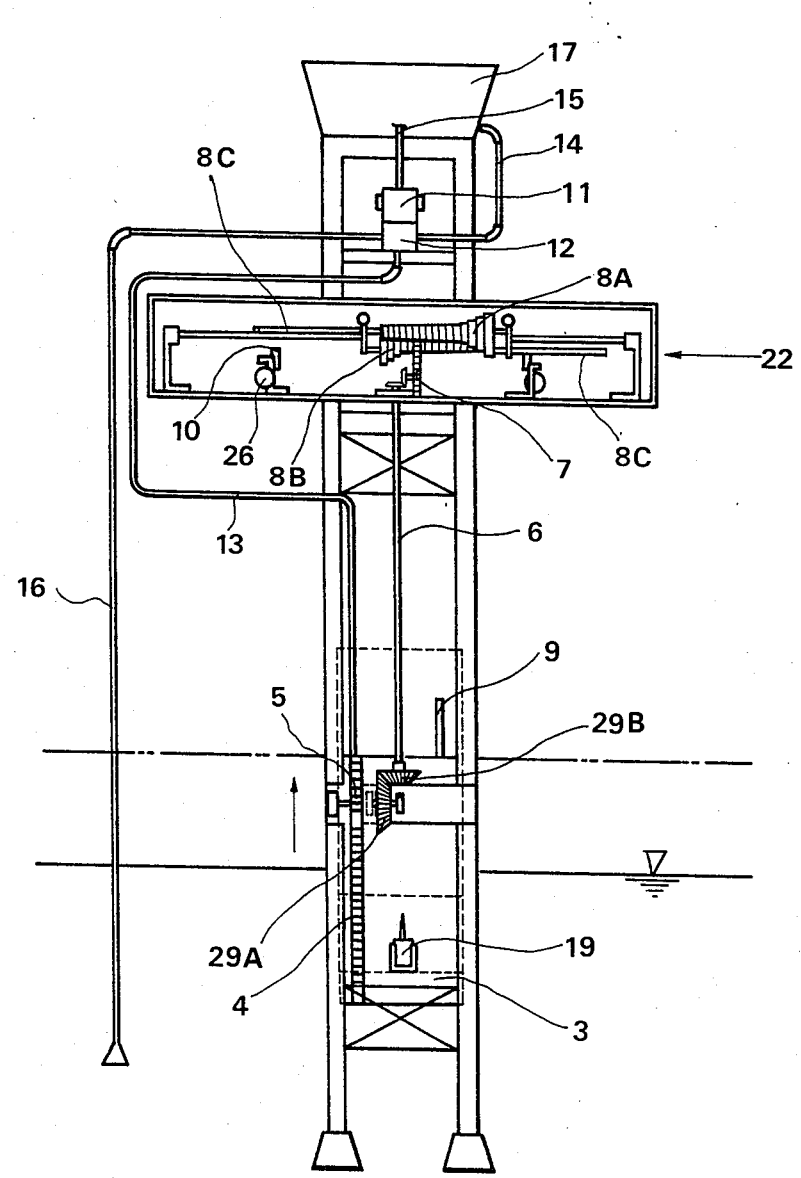
FIG. 3 similar to FIG. 2 shows the effect of the low tide on the buoyant apparatus.

FIG. 8B illustrates the case in which the water from the lower reservoir (17) flows into the buoyant container (2). As shown in FIG. 3, when the buoyant container (2) reaches its highest position, the flood gate (19) is opened by a suitable means, i.e., electric switch, as shown in FIG. 9, and the buoyant container stops at a height where the weight of the buoyant container (2) balances with the buoyancy force. At that point, the gear (10) is locked by means of the brake (30). Accordingly, the buoyant container (2) is suspended even at low tide. Subsequently, the flood gate (19) is closed by means of an electric switch and the four-way valve is activated as shown in FIG. 8B. The water from the lower reservoir flows into a buoyant container (2) thereby, increasing the weight of the buoyant container. Thus, the kinetic energy increases in accordance with the increased weight of the container. However, before that time, the converting apparatus (23) is changed from the position shown in FIG. 6A to FIG. 6B the conic helical gear (8B) engages with the gear (7). FIG. 8C illustrates the position of the four-way valve when the water flows from the lower reservoir (17) into the buoyant container (2) and the sea water is pumped into the upper reservoir. During low tide, the locking apparatus is released and the buoyant container (2) drops causing the shaft (8C) to be rotated by means of the rack (4), pinion (5), conic helical gear (8B) and the gear (7). Shaft (8C), in turn, causes gear (10) to rotate and drive the pump (11) connected to the shaft of gear (10). As a result, the outside sea water is pumped into the upper reservoir (18). FIG. 8D illustrates that only outside sea water can be pumped through the ducts (15, 16). If the said buoyant container (2) falls to the intermediate position, the position of the four-way valve is changed from the position shown in FIG. 8C to that shown in FIG. 8D by a suitable means of electrical control. Therefore, the outside sea water is only pumped into the upper reservoir (18).

FIG. 8E illustrates the case in which all the ducts are in a closed position. When the said buoyant container (2) drops to the lowest position, the four-way valve is positioned as shown in FIG. 8E. As a result, water is discharged from the buoyant container through the flood gate (19) by suitable control means so as to balance the buoyant force of the buoyancy container (2) with its gravity, after which time, the flood gate (19) is again closed. Subsequently, the buoyant container is fixed by means of the brake (30) and the converting apparatus (23) is changed from the position shown in FIG. 6B to that in FIG. 6A. At that point, the operating cycle has been completed. When the tide again rises, the brake is released causing the buoyant container to rise and the four-way valve changes from the position shown in FIG. 8E to FIG. 8A. The generation of electric power is achieved through repetition of the aforementioned cycle. While I have described my invention in some detail with a preferred embodiment, it will be apparent to those skilled in the art that various changes and modifications can be made without departing from the scope of the invention. The invention should, therefore, not be limited by the description presented above but only by the claims which follow.

I claim:
1. An electric power generating apparatus using the buoyancy energy of tide comprising:
    (a) a float driven by the rise and fall of a body of water and adapted to be filled with a fluid,
    (b) valve means to continuously fill or empty said float during a substantial portion of the path between its extreme limits of travel,
    (c) conic helical gear transmission means between said float and a pump driven by said float,
    (d) locking means to locate said float at the height where the weight of said float and the fluid therein balances with its buoyant force.

2. The apparatus of claim 1, wherein the height of said float is twice the difference between the highest and lowest levels of the tide, and the size of the buoyant container is decided so as to balance the weight of said float and the fluid therein with the buoyant force of the buoyant room when said float is positioned at the highest or lowest level of the tide.

3. The apparatus of claim 1, further comprising an upper reservoir, a lower reservoir and a four way valve, wherein the four way valve is operated to pump the water contained in said float into the upper reservoir, to cause the water to flow from the lower reservoir into said float and to close all ducts during the operating cycle.

4. The apparatus of claim 1, wherein the lead angle of said conic helical gear means increases with the movement from the smallest portion to the largest portion of said conic helical gear means, whereas its pitch remains the same.

5. The apparatus of claim 1, wherein the locking means is operated to lock said float at the highest or lowest level of the tide.

6. The apparatus of claim 1, further comprising converting means, comprising said conic helical gear means, for alternately engaging the pump with a gear train operated by the up and down movements of said float.

7. The apparatus of claim 1, wherein the energy from said float is transmitted to said pump through a group of gears comprising a rack, a pinion, a bevel gear and the conic helical gear means.

8. A method of obtaining energy from tides comprising:
(a) pumping a fluid by means of a float driven by the rise and fall of a body of water,
(b) using said fluid to vary the buoyancy of said float by continuously filling or emptying said float through a substantial portion of its travel,
(c) transmitting the energy from said float to a pump by means of conic helical gear means which compensate for the change in buoyancy.

9. The method of claim 8, wherein a flood gate of said float is opened or closed selectively to cause inflow or outflow of water when said float reaches its highest or lowest position, whereby the buoyancy of said float balances with its gravity.

* * * * *

UNITED STATES PATENT AND TRADEMARK OFFICE
CERTIFICATE OF CORRECTION

PATENT NO. : 4,544,849

DATED : October 1, 1985

INVENTOR(S) : IN K. Choi

It is certified that error appears in the above-identified patent and that said Letters Patent is hereby corrected as shown below:

Title page Item (30) delete Foreign Application Priority Data "March 26, 1980 (KP) D.P.R. of Korea 80-1238".

Signed and Sealed this

Thirtieth Day of August, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,544,849
DATED : October 1, 1985
INVENTOR(S) : IN K. Choi

It is certified that error appears in the above-identified patent and that said Letters Patent is hereby corrected as shown below:

Title page Item (76) "D.P.R. of Korea" should read -- Republic of Korea --.

Title page Item (30) delete Foreign Application Priority Data "March 26, 1980 (KP) D.P.R. of Korea 80-1238".

This certificate supersedes Certificate of Correction issued August 30, 1988.

Signed and Sealed this

Twenty-fifth Day of October, 1988

Attest:

DONALD J. QUIGG

Attesting Officer  Commissioner of Patents and Trademarks